Aug. 13, 1957     W. P. SCHMITTER     2,802,376
POWER TRANSMISSION
Filed Dec. 26, 1951
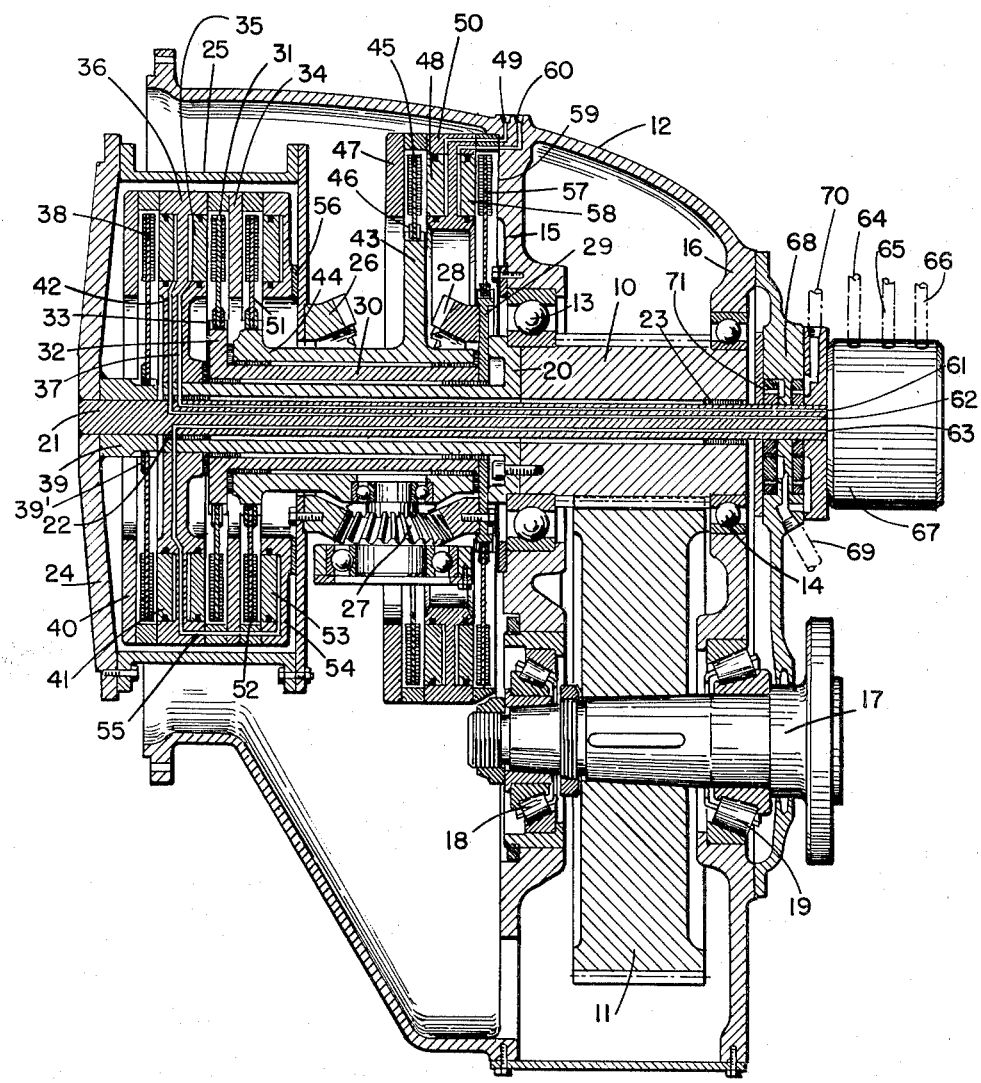
INVENTOR.
Walter P. Schmitter
BY
ATTORNEY United States Patent Office 2,802,376
Patented Aug. 13, 1957

2,802,376

POWER TRANSMISSION

Walter P. Schmitter, Wauwatosa, Wis., assignor to The Falk Corporation, Milwaukee, Wis., a corporation of Wisconsin Application December 26, 1951, Serial No. 263,328

2 Claims. (Cl. 74—757)

This invention relates to reversible power transmissions primarily for marine use.

One object of the present invention is to provide an improved reversible power transmission of the character mentioned in which a second speed of the driven part is available by in-built mechanism requiring no material increase in the space requirements of the transmission.

Other more specific objects and advantages will appear, expressed or implied, from the following description of an illustrative embodiment of the present invention.

The single figure of the accompanying drawing is a longitudinal sectional view of a reversible power transmission constructed in accordance with this invention.

The transmission shown comprises an intermeshing pinion 10 and gear 11, constituting a speed reduction gear set, within a suitable housing 12. The pinion 11 is journalled at opposite ends in bearings 13 and 14 respectively seated in a support 15 and housing end wall 16, and the gear 11 is carried by and rotatable with a driven shaft 17 journalled in bearings 18 and 19 similarly supported. In this instance the pinion 10 is hollow and rigidly attached to a forwardly extending quill shaft 20 coaxial therewith. The pinion 10 and shaft 20 provide support for a drive shaft 21 extending therethrough and journalled in widely spaced sleeve bearings 22 and 23 seated in the quill shaft and pinion, respectively.

The shaft 21 is driven from an appropriate prime mover, such as a Diesel engine (not shown), to which it is connectable through a driving disk 24 fixed to the forward end of the shaft 21. In this instance the disk 24 carries a drum 25 rigidly attached at its forward end thereto and carrying a bevel gear 26 attached to the rear end thereof. The gear 26 is concentrically disposed with respect to the shaft 21 and meshes with a set of planet gears 27 mounted in a manner to be later described. The planet gears 27 also mesh with a bevel gear 28 carried by a disk 29 attached to the rear end of a quill shaft 30 journalled on and supported by the quill shaft 20.

The gear 28 is releasably connectable to the pinion 10 preferably through a friction clutch encircling the shaft 21 and having clutch faces radially spaced a substantial distance therefrom so as to transmit the torque load to best advantage. The clutch shown for this purpose includes a flexible friction disk 31 in loose interlocking engagement with a radial flange 32 on the forward end of the shaft 30, the flange and disk having sets of intermeshing teeth 33 for that purpose. The outer marginal portion of the disk 31 is loosely interposed between a rigid friction disk 34 and an annular piston 35, both of which are carried by and rotatable with a rigid circular structure 36 fixed to the forward end of the shaft 20. The structure 36 is recessed to receive the piston 35 which is closely fitted for axial movement therein. The arrangement is such that when the piston 35 is energized by fluid pressure applied to the inner face thereof through a suitable duct 37, the disk 31 is pressed thereby into frictional gripping engagement with the disk 34 to thereby close the clutch and operatively connect the shaft 20 and pinion 10 to the shaft 30 and gear 28.

The circular structure 36 is also releasably connectable to the drive shaft 21 through a similar clutch including a flexible friction disk 38 in loose driving engagement with the hub 39 of the driving disk 24 through intermeshing teeth 39', the disk 38 being interposed between a rigid friction disk 40 carried by the structure 36 and an annular piston 41 fitted in the latter. When energized by fluid pressure transmitted through a duct 42, the piston 41 presses the flexible disk 38 into frictional gripping engagement wtih disk 40 to thereby connect the pinion 10 to the drive shaft 21 for rotation therewith. The clutch, including disk 38, is thus closed to effect rotation of the driven shaft for forward operation.

During forward running the clutch, including disk 31, is also preferably closed so as to effect rotation of the gear 28 in unison with the gear 26 and so as to cause the planet gears 27 to travel therewith about the axis of the shaft 21, and thus to avoid relative rotation between the gears 26 and 28 and planets 27.

Each of the several planet gears 27 is journalled in a suitable cage 43 which in this instance is carried by a quill shaft 44 supported on and freely rotatable relative to the quill shaft 30 heretofore mentioned. Provision is made for controlling rotation of the planet cage 43, and more particularly, for arresting rotation thereof or for connecting the same in driving relation with the pinion 10, for purposes which will later appear.

To arrest rotation of the planet cage 43 a brake similar to the clutches above described is preferably employed. The brake shown for this purpose includes a flexible friction disk 45 loosely interlocked to the periphery of the cage 43 through intermeshing teeth 46. The disk 45 may be pressed into frictional gripping engagement with a stationary rigid disk 47 by the action of an annular piston 48 energized and controlled by fluid pressure transmitted through a suitable duct 49. The disk 47 and piston 48 are carried by a stationary annulus 50 securely anchored to and within the housing 12.

In this instance the clutch for connecting the planet cage 43 to the pinion 10 includes a flexible friction disk 51 flexibly interlocked to the forward end of the quill shaft 44 and interposed between a rigid friction disk 52 carried by the structure 36 and an annular piston 53 fitted in an annulus 54 also carried by the structure 36. The piston 53 is energized and controlled through a suitable fluid pressure transmitting duct 55.

The end thrust imposed on the gear 26 is sustained by a suitable end thrust bearing 56 interposed between the annulus 54 and inner end wall of the drum 25.

Provision is also made for arresting rotation of the gear 28. The brake employed for this purpose is preferably similar to that above described and includes a flexible friction disk 57 in loose interlocking engagement with the gear carrier disk 29 heretofore mentioned, an annular piston 58 in the stationary annulus 50 being operable to press the disk 57 into frictional engagement with an annular face 59 formed on the support 15. The piston 58 is energized and controlled by fluid pressure transmitted through a duct 60.

As above noted, forward rotation of the driven shaft 18 is effected by closing the clutch, including the disk 38, the clutches, including the disks 31 and 52, preferably being also closed, so as to effect rotation of both gears 26 and 28, the planet cage 43, and the planet gears 27, as a unit, with the pinion 10. Both brakes are of course released during forward running.

To effect reverse rotation of the driven shaft 15, the clutch, including the disk 31, is closed to connect the gear 28 to the pinion 10, and the brake, including the disk 45, is applied to arrest rotation of the planet cage 43, whereupon the continuously rotating gear 26 acts through the then non-traveling planet gears 27 to drive the gear 28, and consequently the pinion 10, in a reverse direction. During reverse running, the other clutches, including the disks 38 and 52, are of course open and the other brake, including the disk 57, is released.

However, during the period of change from forward to reverse running, the brake, including the disk 58, is preferably utilized to sustain the heavy torque reaction loads imposed by the inertia of the shaft 15 and other driven parts during the initial decelerating period and to ultimately bring those parts to rest, so as to relieve the prime mover of that duty and to thereby preserve and make available the kinetic energy in the prime mover for effecting prompt and rapid re-acceleration of the driven parts at the instant of reversal. For this purpose this brake is momentarily closed, simultaneously with the closing of the clutch, including disk 31, until rotation of the driven parts has been reduced substantially to zero, whereupon this brake is released at the instant of application of the other brake, including disk 45. By this sequence of operation of clutches and brakes it is possible to effect complete reversal from full speed ahead to full speed astern more smoothly and within a briefer time interval than would otherwise be possible.

To effect forward rotation of the driven parts at a lower speed appropriate for trolling, the clutch, including disk 52, is closed, to thereby connect the planet cage 43 to the pinion 10, and the brake, including disk 57, is applied to hold the gear 28 against rotation, whereupon the continuously rotating gear 26 acts through the planet gears 27 to effect rotation of the planet cage 43 and pinion 10 at a speed of one half that of the gear 26 and in the same direction. During such operation the other clutches are of course open and the other brake is released.

From the foregoing it will be noted that a power transmission of highly compact and rugged construction has been provided, by which a desirable speed reduction is effected between the prime mover and driven part, and which is selectively operable during continuous operation of the prime mover to effect operation of the driven part in either direction or at either of two speeds in one direction. It will be noted also that in the transmission shown a single set of planet pinions are utilized to effect reversal and also to effect low speed operation of the driven part, thereby reducing the number of parts heretofore required to perform such functions and thus simplifying the construction and advantageously reducing the space requirements of power transmissions of this type.

Oil under pressure is preferably employed as a pressure transmitting medium for controlling the several brakes and clutches. In this instance each of the clutch control ducts 37, 42 and 55 are in separate permanent communication with one of three ducts 61, 62 and 63 extending lengthwise of the drive shaft 21, and each of the latter are in separate permanent communication with one of three pipes 64, 65 and 66 connected to the non-rotating head 67 of a rotary joint of a well known type. A suitable pump, preferably a well known type of gear pump 68, continuously driven by the shaft 21, receives oil from the bottom of the housing 12 through a pipe 69, and discharges oil under pressure through a pipe 70 to an appropriate set of valves (not shown) through which the pressure oil may be directed to the desired pipe or pipes 64, 65 or 66 for the control of the clutches, and or to the desired brake controlling ducts 49 or 60. A second pump 71, also driven by the shaft 21 and supplied from the same source, supplies oil to the several operating parts for purposes of lubrication.

Various changes may be made in the embodiment of the invention hereinabove specifically described without departing from or sacrificing the advantages of the invention as defined in the appended claims.

I claim:

1. In a power transmission the combination of driving and driven members, a gear rotatable with said driving member, a second gear, a set of planet gears meshing with both of said gears, a rotary carrier for said planet gears, means for releasably connecting said driving member to said driven member independently of said planet gears to rotate the latter in one direction, means restraining said carrier against rotation and for releasably connecting said second gear to said driven member to effect rotation of said driven member in a reverse direction, and means for restraining said second gear against rotation and for releasably connecting said rotary carrier to said driving member to effect rotation of said driven member at reduced speed.

2. In a power transmission the combination of driving and driven members, a gear rotatable with said driving member, a second gear, a set of planet gears engaged with both of said gears, a rotary carrier for said planet gears, a clutch including a friction disk connected to said driving member for connecting said driving and driven members independently of said planet gears to effect operation of said driven member in one direction, a brake for arresting rotation of said rotary carrier, a second clutch including a friction disk connected to said second gear for connecting said second gear to said driven member to effect operation of said driven member in a reverse direction when said brake is applied, a second brake for arresting operation of said second gear, and a third clutch including a friction disk connected to said rotary carrier for connecting said carrier to said driven members to effect operation of said driven member at a reduced rate when said second brake is applied.

References Cited in the file of this patent

UNITED STATES PATENTS

| | | |
|---|---|---|
| 1,039,968 | Leech | Oct. 1, 1912 |
| 1,706,888 | Krauss | Mar. 26, 1929 |
| 1,707,785 | Clark | Apr. 2, 1929 |
| 1,896,440 | Durig | Feb. 7, 1933 |
| 2,088,782 | Ford et al. | Aug. 3, 1937 |
| 2,174,672 | Von Soden-Fraunhofen | Oct. 3, 1939 |
| 2,326,935 | Fergusen | Aug. 17, 1943 |
| 2,361,357 | Schmitter | Oct. 24, 1944 |
| 2,458,087 | Maier | Jan. 4, 1949 |
| 2,478,869 | Hasbany | Aug. 9, 1949 |
| 2,511,548 | Shibles | June 13, 1950 |

FOREIGN PATENTS

| | | |
|---|---|---|
| 568,292 | France | Mar. 21, 1923 |